Jan. 8, 1963 R. W. WENGEL 3,072,024

BUSINESS CARD STRUCTURE

Filed June 20, 1960

RAYMOND W. WENGEL
INVENTOR.

BY R. Frank Smith
Lloyd F. Seebach
ATTORNEY & AGENT

United States Patent Office 3,072,024

Patented Jan. 8, 1963

3,072,024

BUSINESS CARD STRUCTURE

Raymond W. Wengel, Rochester, N.Y., assignor to Eastman Kodak Company, Rochester, N.Y., a corporation of New Jersey Filed June 20, 1960, Ser. No. 37,308
1 Claim. (Cl. 93—1)

The present invention relates to record or statistical cards and more particularly to such a card provided with a removable core which, when removed from the card, provides an aperture into which a film can be inserted for mounting purposes.

Record cards which are provided with an aperture into which a film can be inserted are well known, such a card being disclosed in U.S. Patent 2,511,859 in the name of John F. Langan and comprising a sheet of thin pressure-sensitive material arranged over the card aperture and secured to the card around the aperture. A cover plate is inserted in the aperture and secured to the adhesive surface of the sheet within the aperture. The cover plate serves to protect the adhesive surface and at the same time prevents the adhesive material from adhering to other cards, when the cards are stacked, and also prevents the cards from sticking to machine parts when they are moved through punching and/or film mounting apparatus. For such cards to be used, handled, and punched successfully before the film is mounted in the aperture in place of the cover plate, the cover plate or sheet is an essential part of the card and the card cannot be used to advantage without it. In the preparation of such cards, the cover plate necessitates additional operations, such as insertion into the card aperture for handling and removal before the film can be placed in the aperture, as well as additional tape material, both of which result in a card which is more costly.

The present invention eliminates the use of a separate cover plate by utilizing the card material, which would normally be removed from the card, as a cover plate to protect the adhesive material. This is accomplished by die-cutting an area of predetermined size and shape in a predetermined location of the card, the cuts or slits being noncontinuous so the area or core remains connected to the card by at least one bridge on each side of the area. Before the sheet of pressure-sensitive adhesive material is placed over the core and secured to the card, an adhesive-resisting coating is applied to the area to prevent the adhesive material from sticking to the core. With this card structure, no cover plate is needed, the adhesive material is protected and the card surface is continuous on both sides. After the card has been prepared by punching the required data therein, the core is removed and upon removal provides an aperture into which the film can be positioned and retained by the adhesive material within the aperture. It can be readily appreciated that considerable time and expense is saved by die-cutting a core rather than completely removing the core and then utilizing separate apparatus primarily for reinserting a cover plate which must also be removed eventually to permit the film to be inserted and secured in the aperture. By using a thermosetting adhesive material in place of a pressure-sensitive material, the adhesive-resisting coating can, of course, be eliminated, thereby effecting the saving of additional time and expense.

The primary object of the invention is therefore to provide a record card having a removable core of predetermined size and shape in a predetermined location on the card to provide an aperture in the card, when removed.

Another object of the invention is to provide a record card having a core of predetermined size and shape in a predetermined location on the card, the core being retained in its relation to the card by bridges of uncut card material and being removable to provide an aperture in the card.

Still another object of the invention is to provide a record card having a removable core of predetermined size and shape in a predetermined location on the card with a sheet of thin adhesive material arranged over the core and secured only to the marginal portions of the card surrounding the core.

And yet another object of the invention is to provide a record card having a removable rectangular core in a predetermined location on the card, an adhesive-resisting coating on the marginal portions of the core, and strips of thin, pressure-sensitive adhesive material secured to the card on each side of the core and overlying the adhesive-resisting coating, the core being removable to provide an aperture in the card.

These and other objects and advantages will be apparent to those skilled in the art by the description which follows:

Reference is now made to the accompanying drawing wherein like reference numerals designate like parts and wherein.

Figure 1:
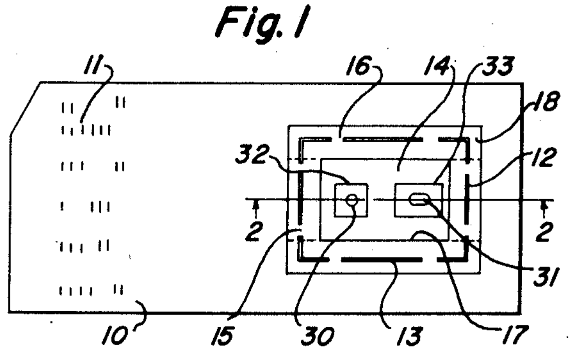
FIG. 1 is a face view of a card embodying the invention with the removable core still in position with respect to the card.

With reference to FIG. 1, the numeral 10 designates a record card of the Hollerith or IBM type which is punched as indicated at 11 with information or data relating to the film to be ultimately carried or mounted in an aperture in the card. In a predetermined location at the right-hand side of the card, transverse slits 12 and longitudinal slits 13 are die-cut into the card to define a rectangular area or core 14. Slits 12 and 13 are non-continuous so as to form narrow bridges 15 and 16 of card material which retain core 14 in its original position with respect to the body of card 10. While core 14 is described as being rectangular, it can be of any size and shape compatible with the size and shape of the film or other insert to be positioned with respect to the card in place of core 14 as described hereinafter. Also, the number of bridges 15 and 16 on each side of core 14 can vary in number depending on the size and shape of the core. In the embodiment described herein, it has been found that two bridges on each side of the core, as shown in FIG. 1, not only hold the core in position, but maintain the core flat so the corners do not tend to curl and present a problem when the cards are fed through a machine for punching the necessary data in the card. Slits 12 and 13 are relatively narrow in width and bridges 15 and 16 need only be of a width sufficient to retain core 14 in position.

Figures 2, 3:
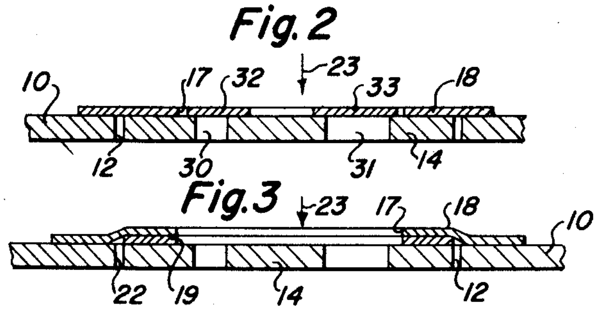
FIG. 2 is an enlarged vertical section taken substantially along line 2—2 of FIG. 1.
FIG. 3 is an enlarged vertical section similar to FIG. 2 showing the adhesive-resisting coating applied to the core.

A sheet of thin material, such as cellulose acetate having either a film of pressure-sensitive adhesive or a film of thermosetting adhesive on one surface thereof, can be arranged over core 14, said sheet being secured only to the marginal portions of card 10 surrounding the core, as shown in FIGS. 1 and 2. Preferably, the sheet is blanked-out in the center to provide a rectangular opening 17 which is smaller than core 14, so that in effect it provides a frame 18, a portion of which is secured to marginal portions of the card surrounding core 14 and the inner portion of which overlies slits 12 and 13 and the marginal portions of core 14, as shown in FIG. 2. Frame 18 can also be formed of strips of an adhesive coated material, such as previously mentioned, which when applied to the card also results in a frame, such strips being indicated by the dotted lines in FIG. 1. The term "thin sheet of adhesive material" is therefore meant to include cellulose acetate or any similar material having either a pressure-sensitive or thermosetting film of adhesive on one side thereof.

To prevent the inner portion of frame 18 which overlies core 14 from adhering to the core when a pressure-sensitive adhesive frame is used, an adhesive-resisting coating is applied to the surface of core 14 which faces the adhesive surface of frame 18. If a sheet of pressure-sensitive adhesive material is used, the coating is applied to the entire area of the core. On the other hand, if a frame is used, then the coating need be applied only to the marginal portions of core 14, this coating of adhesive-resisting material being disclosed by numeral 19 in FIG. 3 wherein the thickness of the coating is grossly exaggerated. The coating 19 can be of hard wax, of a silicon wax, of Teflon or any other material which will prevent or at least resist adherence of the adhesive surface of frame 18 to the core 14. It has been found that if the adhesive is of the polyacrylic type, polyethylene mold release will serve as a resist layer.

Figure 4:
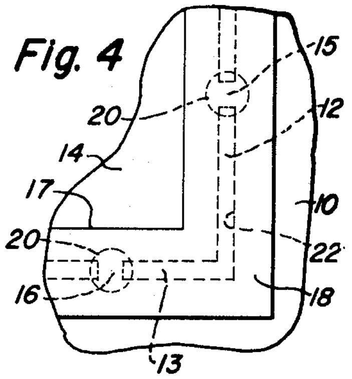
FIGS. 4 and 5 are enlarged face views of a portion of a card showing two different ways in which the bridges of card material can be punched out or cut, respectively, to remove the core.
Figure 5:
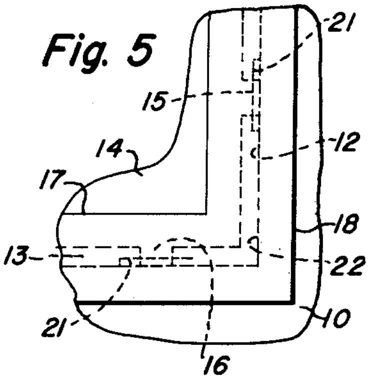

The bridges 15 and 16 can be severed to permit removal of core 14 by punching out the bridges as indicated by the dotted circles 20 in FIG. 4, or the bridges can be cut by slitting the frame and bridges at the outer edges of slits 12 and 13 as indicated by the dotted rectangle 21 in FIG. 5. With either of these methods of breaking bridges 15 and 16, the frame is, of course, left with an opening or slit and core 14 can then be removed. With the removal of core 14, card 10 is then provided with an aperture 22 which is defined by the outer edges of slits 12 and 13. To facilitate the formation of this aperture, it is desirable that slits 15 and 16 be joined at the corners to ensure that the corners of core 14 are definitely removed.

Figure 6:
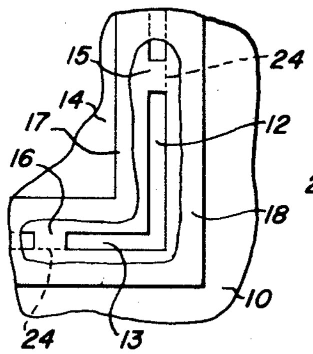
FIGS. 6 and 7 are enlarged views of a portion of a card showing the different forms of bridges of card material for maintaining the removable core in position with respect to the card.
Figure 7:
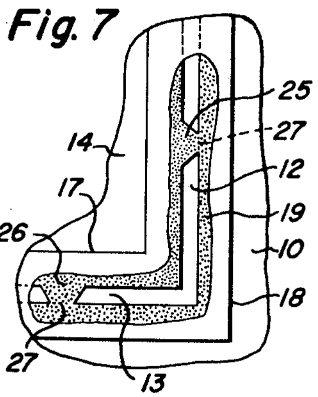
Figures 9, 10:
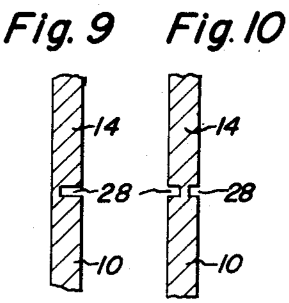
FIGS. 8, 9 and 10 are a detail and sectional views showing the bridge scored on one and both sides of the card to facilitate removal of the core by applying a force to the core and normal to the surface of the card.
Figure 8:
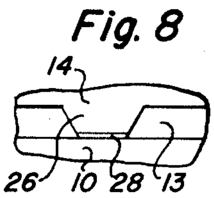

Bridges 15 and 16 can also be broken by applying a force to the surface of core 14 which is normal to the plane of card 10 and directed to urge core 14 away from frame 18, such force being indicated by arrows 23 in FIGS. 2 and 3. It is desirable to have bridges 15 and 16 break along the dotted lines 24 in FIG. 6, to ensure that the edges of the aperture are smooth and continuous. This can be accomplished by forming bridges 25 and 26, as shown in FIG. 7, wherein the portion joined to the card 10 is smaller than that joined to core 14. With this latter type of bridge, core 14 will always break along the dotted line 27 which is aligned with the outer edge of slits 12 and 13. To further ensure that bridges 25 and 26 will break along the outer edge of the slits 15 and 16, the bridges can be scored as at 28 on one side, as shown in FIG. 9, or on both sides, as shown in FIG. 10, the scoring being made in alignment with the outer edge of slits 12 and 13 at the time the card is provided with said slits.

When core 14 has been removed from card 10 by punching, cutting or breaking bridges 15 and 16, or 25 and 26, as described above, the aperture 22 is provided in the card 10 with the inner portion of frame 18 extending over and into the card aperture. A piece of film 29 substantially the size and shape of the aperture can then be positioned in the aperture and secured to the adhesive surface of frame 18 within the aperture either by pressure if a pressure-sensitive adhesive is used or by a combination of heat and pressure applied to the marginal portions of the film insert when a thermosetting adhesive is used.

When core 14 is still in position with respect to card 10 and at the time data is punched in the card, which is usually before the film is inserted in the card aperture, data relating to the film insert can also be punched into core 14. Upon removal of core 14 from the card, the core can then be used for verification of the film to be inserted in the card. For this purpose, core 14 can be provided with holes 30 and 31 which can be utilized for locating core 14 in apparatus for reading the data punched therein. These holes can be covered temporarily with small pieces 32 and 33 of a pressure-sensitive adhesive material in the event a group of cards is sorted or machine handled for any purpose prior to insertion of the film.

Figure 11:
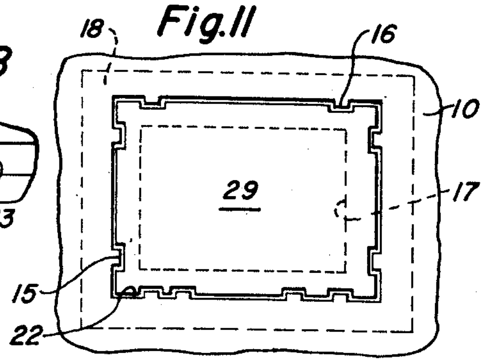
FIG. 11 is a partial detail view showing a card having bridges of card material spaced about the core in accordance with notches in the insert.

In addition, bridges 15 and 16 can be utilized as a means for locating and retaining in position in the aperture a film insert having a plurality of notches arranged in nonsymmetrical positions about the periphery thereof to uniquely identify the same. This can be accomplished by severing or scoring bridges 15 and 16 or 25 and 26 at the inner ends of the bridges so as to join the inner edges of slits 12 and 13. Bridges 25 and 26 would then have to have the portion joining core 14 smaller than that joining card 10. When core 14 is then removed, aperture 22 would be provided with spaced projections of card material formed by the bridges extending into aperture 22. At the time slits 12 and 13 are formed in card 10, the arrangement of bridges 15 and 16 or 25 and 26 can be determined beforehand in accordance with a particular code for each film insert or for a group of film inserts having notches arranged about the periphery thereof and the aperture 22 will then receive only those inserts whose peripheral configuration will correspond with the projections of card material or bridges extending into aperture 22, as shown in FIG. 11.

While the invention has been described with respect to a specific type of card, it will be readily apparent to those skilled in the art that the structure described herein can be utilized in connection with other types of cards as well. Also, materials other than film such as paper, photographic prints, etc. can be inserted in the card and the size and shape of the card and material need not be necessarily limited to the rectangular embodiment described herein. Since other modifications are possible, the invention is not to be limited to any of the embodiments disclosed and described herein but is of a scope as defined by the appended claim.

Having now particularly described my invention, what I desire to secure by Letters Patent of the United States and what I claim is:

The method of mounting in a record card, an insert having a plurality of notches arranged in nonsymmetrical positions about the periphery of the insert to uniquely identify the same, which method comprises:

- slitting said card at a predetermined location to define a many-sided area of substantially the same size and overall configuration as said insert and to define connecting bridges of card material having substantially the same size and shape as said notches and being located about said area in nonsymmetrical positions corresponding to the notches in said insert;
- applying a film of adhesive-resisting material to the marginal portions of one surface of said area;
- applying a frame of pressure-sensitive adhesive carrying material to said one surface of said card and overlying said slits and said adhesive-resisting coating;
- severing said bridges at the inner ends thereof to remove said area thereby exposing a portion of said pressure-sensitive material and forming an aperture in said card with portions of card material extending into said aperture whereby only inserts having a peripheral configuration complementary thereto can be positioned therein; and securing said insert to the exposed portion of said pressure-sensitive material within said aperture.

References Cited in the file of this patent

UNITED STATES PATENTS

| | | |
|---|---|---|
| 1,500,025 | Mayer | July 1, 1924 |
| 2,109,603 | Worth | Mar. 1, 1938 |
| 2,512,106 | Langan | June 20, 1950 |
| 2,627,212 | Connor | Feb. 3, 1953 |
| 2,690,021 | Langan | Sept. 28, 1954 |
| 2,896,351 | Johnson | July 28, 1959 |
| 2,951,304 | Herte | Sept. 6, 1960 |